(12) United States Patent
Wang

(10) Patent No.: US 8,995,620 B2
(45) Date of Patent: Mar. 31, 2015

(54) INDUCTOR SWITCHING LC POWER CIRCUIT

(71) Applicant: Moxtek, Inc., Orem, UT (US)

(72) Inventor: Dongbing Wang, Saratoga Springs, UT (US)

(73) Assignee: Moxtek, Inc., Orem, UT (US)

( * ) Notice: Subject to any disclaimer, the term of this patent is extended or adjusted under 35 U.S.C. 154(b) by 222 days.

(21) Appl. No.: 13/863,144

(22) Filed: Apr. 15, 2013

(65) Prior Publication Data

US 2014/0133633 A1 May 15, 2014

Related U.S. Application Data

(60) Provisional application No. 61/668,579, filed on Jul. 6, 2012.

(51) Int. Cl.
*H05G 1/12* (2006.01)
*H02M 7/42* (2006.01)
*H02M 7/538* (2007.01)
*H02M 7/48* (2006.01)

(52) U.S. Cl.
CPC ............... *H02M 7/42* (2013.01); *H02M 7/538* (2013.01); *H02M 2007/4815* (2013.01); *H05G 1/12* (2013.01); *Y02B 70/1441* (2013.01)
USPC .......................................... 378/106; 378/112

(58) Field of Classification Search
CPC ....... H02M 7/043; H02M 7/42; H02M 7/538; H02M 2007/4815; H05G 1/12; H05G 1/14; H05G 1/20; H05G 1/22; Y02B 70/1441
USPC .................... 363/140; 378/106, 107, 111, 112
See application file for complete search history.

(56) References Cited

U.S. PATENT DOCUMENTS

| 2,055,591 | A | * | 9/1936 | Rau ............................ 378/105 |
| 3,781,643 | A | | 12/1973 | King |
| 4,805,080 | A | * | 2/1989 | Nieminen ..................... 378/101 |
| 5,132,999 | A | * | 7/1992 | Wirth ............................ 378/101 |
| 6,008,589 | A | | 12/1999 | Deng et al. |
| 6,161,374 | A | | 12/2000 | Sverdlin |
| 2004/0264642 | A1 | * | 12/2004 | Katcha et al. .................. 378/107 |
| 2005/0105305 | A1 | | 5/2005 | Sawada et al. |
| 2006/0165220 | A1 | * | 7/2006 | Takahashi et al. ............ 378/109 |
| 2009/0195303 | A1 | | 8/2009 | Bowhers |

FOREIGN PATENT DOCUMENTS

| EP | 0647086 | 8/1994 |
| JP | 05205897 A | * 8/1993 |

OTHER PUBLICATIONS

U.S. Appl. No. 13/741,220, filed Jan. 14, 2013; Wang.

* cited by examiner

*Primary Examiner* — Glen Kao

(57) ABSTRACT

An electrical circuit for alternating current generation comprising a direct current control box, a first inductor, a second inductor, a first capacitor, and dual load connections. The direct current control box can alternately provide positive direct current to the first inductor then negative direct current to the second inductor. A second end of each inductor can be electrically connected together and electrically connected to a first load connection. A common connection on the control box can be electrically connected to a second load connection. The first load connection and the second load connection can be configured to be electrically connected across a load. A first capacitor can be electrically connected between the first load connection and the second load connection and configured to be electrically connected in series or parallel parallel with the load.

20 Claims, 3 Drawing Sheets

INDUCTOR SWITCHING LC POWER CIRCUIT

CLAIM OF PRIORITY

Priority is claimed to U.S. Provisional Patent Application Ser. No. 61/668,579, filed on Jul. 6, 2012; which is incorporated herein by reference in its entirety.

FIELD OF THE INVENTION

The present application is related generally to power supplies.

BACKGROUND

Beneficial features of electrical power supplies, especially portable power supplies, are small size and low cost. Some electrical power supplies are susceptible to short circuiting, which can result in wasted power and damage to components. In order to avoid damage to components, larger sized components can be designed into the circuit. Such larger sized components, used to compensate for short circuiting, can result in a larger than desired power supply. Cost savings can result from use of fewer components, smaller components, and/or reducing or eliminating wasted power due to short circuits.

SUMMARY

It has been recognized that it would be advantageous to have an economical power supply that is relatively small in size and reduces wasted electrical power. The invention is directed an electrical circuit that can provide electrical power and satisfy these needs.

The electrical circuit can comprise a direct current control box alternately providing positive direct current to a first end of a first inductor then negative direct current to a first end of a second inductor. A second end of each inductor can be electrically connected together at an inductor connection point and electrically connected to a first load connection. A common connection of the control box can be electrically connected to a second load connection. The first load connection and the second load connection can be configured to be electrically connected across a load. A first capacitor can be electrically connected to be in parallel or in series with the load.

DETAILED DESCRIPTION

Figure 1:
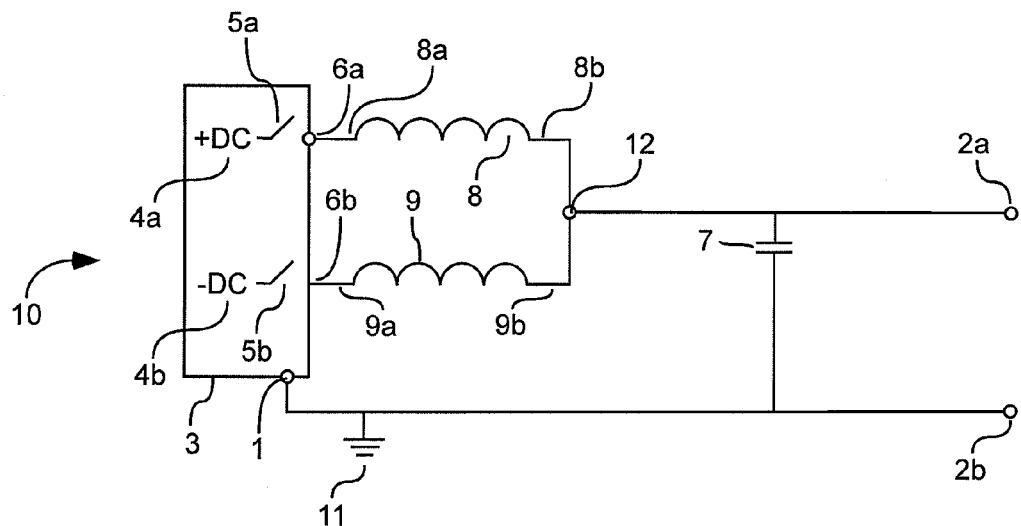
FIG. 1 is a schematic of an alternating current generation circuit, configured for attachment of a load in parallel with a first capacitor, in accordance with an embodiment of the present invention.
Figure 2:
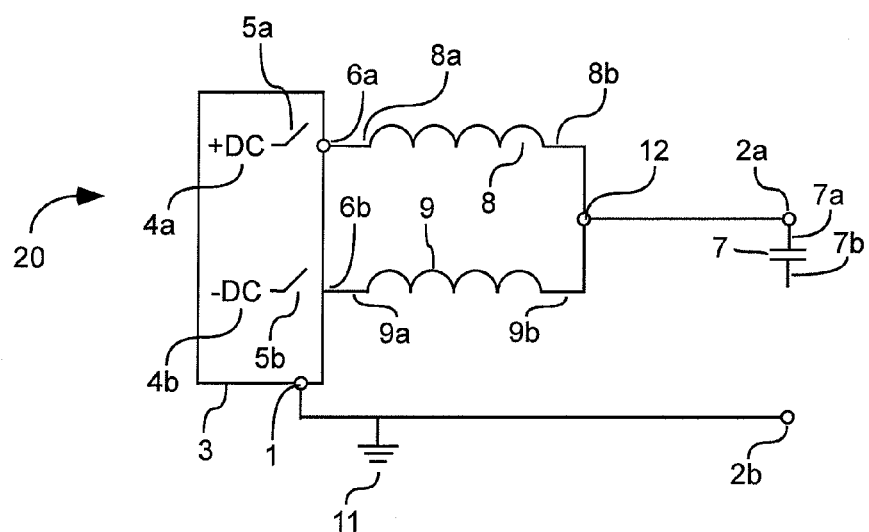
FIG. 2 is a schematic of an alternating current generation circuit, configured for attachment of a load in series with the first capacitor, in accordance with an embodiment of the present invention.

As illustrated in FIGS. 1 and 2, electrical circuits 10 and 20, for producing alternating current, are shown comprising a direct current control box 3, two inductors 8-9 electrically connected to the direct current control box 3, a capacitor 7, and electrical connections for a load 2a-b. The direct current control box 3 can comprise a positive direct current supply 4a, a positive direct current connection 6a, and a first control box switch 5a electrically connected between the positive direct current supply 4a and the positive direct current connection 6a. The direct current control box 3 can further comprise a negative direct current supply 4b, a negative direct current connection 6b, and a second control box switch 5b electrically connected between the negative direct current supply 4b and the negative direct current connection 6b. The direct current control box 3 can also comprise a common connection 1. In one embodiment, the common connection 1 can be electrically connected to ground 11.

The direct current control box 3 can be electrically connected to two inductors—a first inductor 8 and a second inductor 9. Each inductor can have a first end (8a or 9a) and a second end (8b or 9b). The first end 8a of the first inductor 8 can be electrically connected to the positive direct current connection 6a. The first end 9a of the second inductor 9 can be electrically connected to the negative direct current connection 6b. The second end 8b and 9b of each inductor 8 and 9 can be electrically connected together at an inductor connection point 12 and can be electrically connected to a first load connection 2a. In one embodiment, for a smooth alternating current output, an inductance of the first inductor can equal, or substantially equal, an inductance of the second inductor. Substantially equal inductances are inductances that are close enough that any difference between the two will have negligible effect on the circuit.

The common connection 1 of the control box 3 can be electrically connected to a second load connection 2b. As shown on circuit 10 in FIG. 1, a first capacitor 7 can be electrically connected between the first load connection 2a and the second load connection 2b and between the inductor connection point 12 and the common connection 1 of the control box 3. The first load connection 2a and the second load connection 2b can be configured to be electrically connected to a load. The first capacitor 7 can be configured to be connected in parallel with the load. As shown on circuit 20 in FIG. 2, one end 7a of the first capacitor 7 can be electrically connected to the first load connection 2a. An opposing end 7b of the first capacitor 7 can be configured to be electrically connected to one end of a load.

Additional electronic components can be used to improve the electrical circuits 10 or 20. It can be beneficial for the switches 5a-b to change position (close one switch and open the other) when the first capacitor 7 is fully charged. As shown on the electrical circuits 30 in FIGS. 3 and 40 in FIG. 4, a voltage drop across a resistor 27, added in series with the first capacitor 7, can be used to determine when the first capacitor 7 is fully charged.

Figure 3:
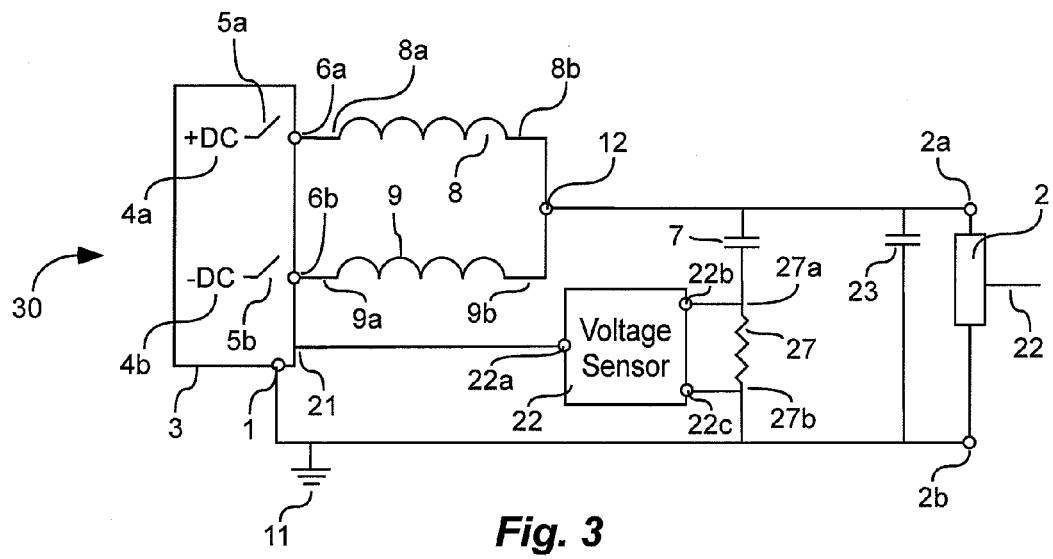
FIG. 3 is a schematic of an alternating current generation circuit with a feedback loop to send a feedback signal to a direct current control box based on a voltage drop across a resistor, and a load electrically connected in parallel with the first capacitor, in accordance with an embodiment of the present invention.
Figure 4:
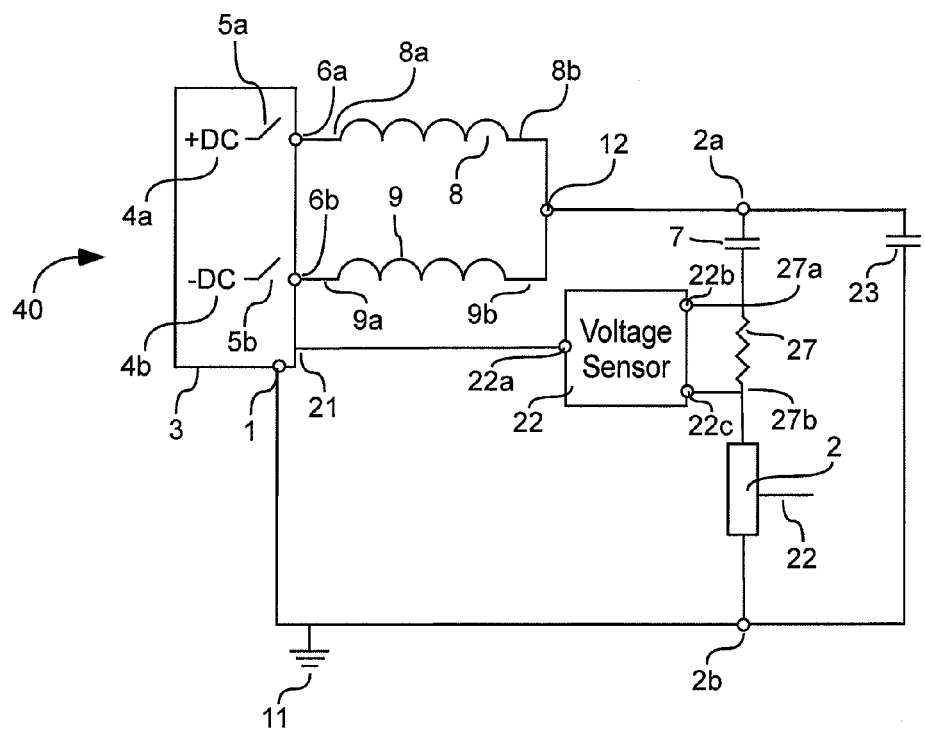
FIG. 4 is a schematic of an alternating current generation circuit with a feedback loop to send a feedback signal to a direct current control box based on a voltage drop across a resistor, and a load electrically connected in series with the first capacitor, in accordance with an embodiment of the present invention.

As shown on circuit 30 of FIG. 3, the resistor 27 and the first capacitor 7 series can be configured to be electrically connected in parallel with a load 2. As shown on circuit 40 of FIG. 4, the resistor 27 and the first capacitor 7 series can be configured to be electrically connected in series with a load 2. The resistor 27 and the first capacitor 7 series can be electrically connected between the first load connection 2a and the second load connection 2b and between the inductor connection point 12 and the common connection 1 of the control box 3. Although FIGS. 3 and 4 show the resistor 27 electrically connected between the first capacitor 7 and the second load connection 2b, the resistor 27 can be electrically connected between the first capacitor 7 and the first load connection 2a. The order of components the first capacitor 7, resistor 27, and load 2 series of FIG. 4 is not critical—these components may be placed in any order.

A voltage sensor feedback connection 21 can be included on the direct current control box 3. A voltage sensor 22 can have a first connection 22a, a second connection 22b, and a third connection 22c. The first connection 22a can be electrically connected to the voltage sensor feedback connection 21. The second connection 22b can be electrically connected to one end 27a of the resistor 27; and the third connection 22c can be electrically connected to an opposing end 27b of the resistor 27. Thus, the voltage sensor 22 can be electrically connected across the resistor 27.

The voltage sensor 22 can be configured to determine a voltage drop across the resistor and can be configured to send a feedback signal to the direct current control box 3 based on the voltage drop across the resistor 27. For example, the voltage sensor 22 can send a feedback signal to the direct current control box 3 to change switch position when the voltage drop across the resistor 27 is zero or is less than a certain value, such as less than 0.5 volts, less than 1 volt, or less than 2 volts for example. A low, or zero, voltage drop across the resistor 27 can indicate that the capacitor is fully charged, and thus the switches should change position. The direct current control box 3 can be configured to close one switch (5a or 5b) and open the other switch (5b or 5a) upon receipt of this feedback signal from the voltage sensor 22.

In order to reduce impedance of the alternating current supply circuits described herein, it can be beneficial to select inductance and capacitance for a resonant circuit. An alternating current frequency f, capacitance of the circuit C, and inductance L of at least one of the inductors can be selected to approximate the following equality:

$$f \approx \frac{1}{2 * \pi * \sqrt{L * C}}.$$

Alternating current frequency f can be determined by how frequently switches 5a-b change position. Inductance can be an inductance L of one of the inductors 8 or 9. Inductors 8 and 9 can be selected to have the same inductance L as each other.

Capacitance C of the circuits previously described can be the capacitance C1 of the first capacitor 7. Alternatively, if it is difficult to obtain a capacitor with optimal capacitance for creation of a resonant circuit, with only the first capacitor 7, then at least one other capacitor 23 may be added in parallel with the first capacitor 7 in order to obtain the best overall capacitance C. As shown in FIGS. 3 and 4, a second capacitor 23 can be electrically connected between the load connections 2a-b, between the inductor connection point 12 and the common connection 1 of the control box 3, and in parallel with the first capacitor 7. Capacitance C of the circuit then can be a sum of the capacitance C1 of the first capacitor 7 and the capacitance of the second capacitor C2 (C=C1+C2). Alternatively, capacitance C of the circuit can be calculated with more than the two capacitors if more are added. Thus, additional capacitors may be added in parallel to form a resonant circuit according to the formula:

$$\approx \frac{1}{2 * \pi * \sqrt{L * C}}.$$

Thus, the term "capacitance C of the circuit," as used herein, means total capacitance of all capacitors electrically connected between the first load connection 2a and the second load connection 2b and between the inductor connection point 12 and the common connection 1 of the control box 3.

Also shown in FIGS. 3 and 4, a load 2 can be electrically connected between the first load connection 2a and the second load connection 2b. In one embodiment, the load 2 can be a high voltage multiplier circuit having a high DC voltage output connection 22.

A decision of whether to have the first capacitor 7 in parallel with the load 2, as shown in FIG. 3, or in series with the load 2, as shown in FIG. 4, may be made based on resistance of the load 2. The parallel configuration may be preferred if the load 2 has a relatively high resistance.

Figure 5:
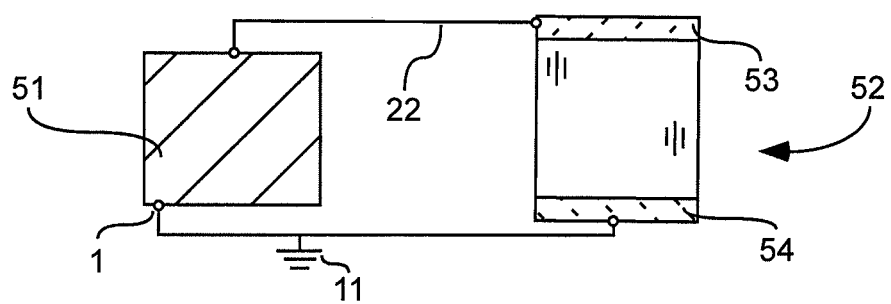
FIG. 5 is a schematic one of the circuits of FIGS. 1-4 providing electrical power to an x-ray tube, in accordance with an embodiment of the present invention.

As shown in FIG. 5, an electrical circuit 51 according to one of the embodiments described herein can be used to provide at least 1 kilovolt of voltage differential between a cathode 53 and an anode 54 of an x-ray tube 32. The high voltage output connection can be connected to the cathode 53 and the anode can be connected to ground 11 or to the common connection 1.

What is claimed is:
1. An electrical circuit comprising:
 a. a direct current control box comprising:
  i. a positive direct current supply, a positive direct current connection, and a first control box switch electrically connected between the positive direct current supply and the positive direct current connection;
  ii. a negative direct current supply, a negative direct current connection, and a second control box switch electrically connected between the negative direct current supply and the negative direct current connection; and
  iii. a common connection;
 b. a first inductor and a second inductor, each inductor having a first end and a second end;
 c. the first end of the first inductor electrically connected to the positive direct current connection and the first end of the second inductor electrically connected to the negative direct current connection;
 d. the second end of each inductor electrically connected together at an inductor connection point and electrically connected to a first load connection;
 e. the common connection of the control box electrically connected to a second load connection;
 f. a first capacitor electrically connected between the first load connection and the second load connection and between the inductor connection point and the common connection of the control box; and
 g. the first capacitor electrically connected in series or in parallel with a load.
2. The electrical circuit of claim 1, further comprising:
 a. a resistor electrically connected in series with the first capacitor and electrically connected between the first load connection and the second load connection and between the inductor connection point and the common connection of the control box;

b. a voltage sensor feedback connection on the direct current control box;
c. a voltage sensor:
   i. having a first connection electrically connected to the voltage sensor feedback connection;
   ii. having a second connection electrically connected to one end of the resistor and a third connection electrically connected to an opposing end of the resistor; and
   iii. configured to send a feedback signal to the direct current control box based on a voltage drop across the resistor; and
d. wherein the direct current control box is configured to close one switch and open the other switch based on the feedback signal from the voltage sensor.

3. The electrical circuit of claim 2, wherein the voltage sensor sends the feedback signal to the direct current control box to close one switch and open the other switch when the voltage drop across the resistor is less than 1 volt.

4. The electrical circuit of claim 1, further comprising a second capacitor electrically connected between the first load connection and the second load connection and in parallel with the first capacitor.

5. The electrical circuit of claim 4, wherein the circuit is designed for resonant frequency.

6. The electrical circuit of claim 1, wherein the load is a high voltage multiplier circuit with a high voltage output connection that is configured to provide at least 1 kilovolt of voltage differential between a cathode and an anode of an x-ray tube.

7. The electrical circuit of claim 6, further comprising the x-ray tube and wherein the high voltage output connection is electrically connected to the cathode and the anode is electrically connected to the common connection.

8. The electrical circuit of claim 1, wherein alternating current frequency f, capacitance of the circuit C, and inductance L of at least one of the inductors are selected to approximate the following equality $$\approx \frac{1}{2*\pi*\sqrt{L*C}}.$$

9. The electrical circuit of claim 1, wherein an inductance of the first inductor equals an inductance of the second inductor.

10. An electrical circuit comprising:
a. a direct current control box configured to alternately provide positive direct current to a first end of a first inductor and then negative direct current to a first end of a second inductor;
b. a second end of each inductor electrically connected together and electrically connected to a first load connection;
c. a common connection of the control box electrically connected to a second load connection;
d. the first load connection and the second load connection configured to be electrically connected to a load;
e. a first capacitor and a resistor electrically connected in series between the first load connection and the second load connection, the resistor and the first capacitor series configured to be electrically connected in parallel with the load;
f. a voltage sensor feedback connection on the direct current control box;
g. a voltage sensor electrically connected to the voltage sensor feedback connection; electrically connected to across the resistor, and configured to send a feedback signal to the direct current control box based on a voltage drop across the resistor; and
h. wherein the direct current control box is configured to close one switch and open another switch based on the feedback signal from the voltage sensor.

11. The electrical circuit of claim 10, wherein the voltage sensor sends the feedback signal to the direct current control box to close one switch and open the other switch when the voltage drop across the resistor is less than 1 volt.

12. The electrical circuit of claim 10, further comprising a second capacitor electrically connected between the first load connection and the second load connection and in parallel with the resistor and the first capacitor series and wherein the circuit is designed for resonant frequency.

13. The electrical circuit of claim 10, further comprising a load and wherein the load is a high voltage multiplier circuit with a high voltage output connection that is configured to provide at least 1 kilovolt of voltage differential between a cathode and an anode of an x-ray tube.

14. The electrical circuit of claim 13, further comprising the x-ray tube and wherein the high voltage output connection is electrically connected to the cathode and the anode is electrically connected to the common connection.

15. The electrical circuit of claim 10, wherein alternating current frequency f, capacitance of the circuit C, and inductance L of at least one of the inductors are selected to approximate the following equality $$\approx \frac{1}{2*\pi*\sqrt{L*C}}.$$

16. An electrical circuit comprising:
a. a direct current control box configured to alternately provide positive direct current to a first end of a first inductor and then negative direct current to a first end of a second inductor;
b. a second end of each inductor electrically connected together and electrically connected to a first load connection;
c. a common connection of the control box electrically connected to a second load connection;
d. the first load connection and the second load connection electrically connected across a high voltage multiplier circuit, the high voltage multiplier circuit configured to provide at least 1 kilovolt of voltage differential between a cathode and an anode of an x-ray tube; and
e. a first capacitor electrically connected in series or in parallel with the high voltage multiplier circuit.

17. The electrical circuit of claim 16, further comprising:
a. a resistor electrically connected in series with the first capacitor, the resistor and the first capacitor series electrically connected in series or in parallel with the high voltage multiplier circuit;
b. a voltage sensor feedback connection on the direct current control box;
c. a voltage sensor electrically connected to the voltage sensor feedback connection; electrically connected to across the resistor, and configured to send a feedback signal to the direct current control box based on a voltage drop across the resistor; and
d. wherein the direct current control box is configured to close one switch and open another switch when the feedback signal from the voltage sensor indicates a voltage of less than 2 volts across the resistor.

18. The electrical circuit of claim 16, wherein alternating current frequency f, capacitance of the circuit C, and inductance L of at least one of the inductors are selected to approximate the following equality $$\approx \frac{1}{2*\pi*\sqrt{L*C}}.$$

19. The electrical circuit of claim 16, wherein an inductance of the first inductor substantially equals an inductance of the second inductor.

20. The electrical circuit of claim 16, further comprising the x-ray tube and wherein the high voltage output connection is electrically connected to the cathode and the anode is electrically connected to the common connection.

\* \* \* \* \*